United States Patent [19]

Rudisill

[11] Patent Number: 4,630,811
[45] Date of Patent: Dec. 23, 1986

[54] MODULAR FIXTURING APPARATUS

[75] Inventor: Carl D. Rudisill, Cincinnati, Ohio

[73] Assignee: Cincinnati Milacron Inc., Cincinnati, Ohio

[21] Appl. No.: 755,643

[22] Filed: Jul. 16, 1985

[51] Int. Cl.$^4$ ............................................. B23Q 3/18
[52] U.S. Cl. .................................... 269/118; 269/305; 269/900
[58] Field of Search ........................ 269/900, 111–120, 269/309–310, 56–57

[56] References Cited

U.S. PATENT DOCUMENTS

| | | | |
|---|---|---|---|
| 1,954,708 | 4/1934 | Mass | 269/112 |
| 2,810,326 | 10/1957 | Bowen | 269/118 |
| 3,024,521 | 3/1962 | Polk | 269/118 |
| 3,229,365 | 1/1966 | Fisher et al. | |
| 3,550,245 | 12/1970 | Davis | |
| 3,606,300 | 9/1971 | Davis | |
| 4,073,215 | 2/1978 | Coope et al. | 269/900 |
| 4,310,963 | 1/1982 | Blumle | 269/900 |

OTHER PUBLICATIONS

Kolb-Werner Information, Efficient and Cost Effective Use of Modular Fixture Kits at Machine Site, Dietmar Gallien and Helmut Hammer, Herman Kolb Werkzeugmaschinen-Fritz Werner Werkzeugmaschinen published in tz fur Metallbearbeitung 77 (1983), No. 5.
1983 SME Technical Paper-Modular Tooling for Flexible Machining-R. P. Dietzen-Mach-Tec Conference; Flexible Manufacturing Systems: An Overview, Dec. 8, 1983, Chicago, IL (SME-Society of Manufacturing Engineers).
Fixture Design: Working with Modules-Alan Drake-Manufacturing Engineering, Jan. 1984, pp. 35 to 38.
New Ideas in Cost Cutting, Fast Change Fixturing-Tooling and Production, Apr. 1984, pp. 44 to 48.

*Primary Examiner*—Robert C. Watson
*Attorney, Agent, or Firm*—Thomas M. Farrell; Donald Dunn

[57] ABSTRACT

A modular fixturing apparatus is provided for locating, orienting and holding a workpiece during a machining operation, having a workpiece specific mounting plate and a carrier apparatus provided with stop means and pusher means for accurately and reproducibly positioning the mounting plate on the carrier. The workpiece specific mounting plate has a workpiece specific pattern of threaded holes adapted to attach locating, clamping and supporting devices to hold the workpiece during the machining operation. Accurate, reproducible location and orientation of successive workpieces of the same geometry on the apparatus for the same machining operations is achieved quickly and positively. Reconstruction of the fixturing apparatus to hold subsequent workpieces of the same geometry in the same location and orientation is also readily achieved.

3 Claims, 10 Drawing Figures

MODULAR FIXTURING APPARATUS

FIELD OF INVENTION

This invention relates to fixtures and apparatus for holding and orienting a workpiece in relation to a tool for performing a shaping operation on the workpiece. In a more particular aspect this invention relates to fixtures and apparatus for holding and orienting a metal workpiece in relation to a tool for performing a metal cutting operation on the workpiece.

BACKGROUND

Various devices having been known and used in the machining art for holding and positioning metal workpieces at or on a machine tool for the performance of metal cutting operations to shape the workpiece. Such devices have employed hand operated, pneumatically operated and hydraulically operated clamps to hold the workpiece on the table of the machine tool or on a support or carrier in a position for machining. In some cases the workpiece has been clamped directly to the table of the machine tool while in other cases the workpiece has been clamped to a support or carrier that is in turn fixed to the table of the machine tool. These systems are usually associated with manually operated machine tools and thus the initial individual positioning of the workpiece at or on the machine tool in relation to the cutting tool did not require high accuracy and repeatability since the manual movement of the table and cutting tool could accurately position the workpiece relative to the cutting tool for the correct machining of the part. Thus, there was no need or requirement for the accurate repeatable location of the workpiece relative to the cutting tool.

With the advent of automatic, more especially unmanned automatic, machining operations, by machine tools under numerical control or computer numerical control, on a series of the same or different workpieces serially presented to the cutting tool the workpieces are usually carried on pallets that are moved from a position remote from the cutting tool to a position in an accurate, known location in respect to the cutting tool for the performance of the machining operation. The failure to achieve the repetitive, accurate positioning of the workpieces and the supports or carriers for successive workpieces can result in improper and incorrect machining of the workpiece and thus result in scrap or result in a machine wreck (i.e. high force incorrect engagement of tool with the workpiece) that may damage the machine tool and/or destroy the workpiece. In automated machining systems workpiece carriers or supports having accurately located threaded holes at the intersections of a square grid pattern on one or more faces of the support or carrier and having a T (tee) post, square column, horizontal plate or vertical plate geometry have been used for positioning and holding the workpiece. The square grid pattern of accurately located threaded holes is expensive to produce and allows for the mounting of the workpiece in numerous orientations and locations on the face of the workpiece support or carrier. In automated machining systems such as for example flexible manufacturing systems, requiring numerous workpiece carriers or supports for the efficient operation of the system the expensive nature of the above described square grid pattern type carrier or support is highly magnified. Additionally the square grid pattern of threaded holes in the above described workpiece carrier or support introduces the opportunity for error in the positioning and clamping of the workpiece on the carrier support.

It is an object of this invention to provide an inexpensive workpiece holding fixture apparatus that reproducibly accurately locates, orients and holds a workpiece during machining. Another object of this invention is to provide a workpiece holding fixture apparatus having a detachable workpiece specific mounting plate member to repeatedly accurately locate, orient and hold the workpiece for machining. A still further object of this invention is to provide a workpiece holding fixture apparatus comprising a carrier member, having a surface for detachably mounting a workpiece specific mounting plate member and at the perimeter of the surface locating stop means for accurately locating, the mounting plate on the carrier and cooperating with the accurately located plate a workpiece specific pattern of threaded holes on the workpiece specific mounting plate to reproducibly accurately locate a workpiece for machining.

SUMMARY OF THE INVENTION

In accordance with this invention there is now provided an apparatus for reproducibly accurately positioning and holding a workpiece for machining. The carrier apparatus, for positioning and holding the workpiece, according to this invention comprises a support element having a planar surface having a perimeter defined by adjacent sides normal to each other and adapted to receive and hold a plate for holding a workpiece, a plurality of plate locating stop means positioned on two adjacent sides of the perimeter of the surface and extending beyond the surface for engaging the perimeter of the plate and locating the plate on the surface, pusher means position at sides of the perimeter of the surface opposing the locating stops for positioning the plate against the stops and a plurality of threaded holes in the surface adapted to mount the plate on the surface. Further, there is provided in accordance with this invention a fixturing apparatus comprising (a) the above described carrier apparatus and (b) a mounting plate for holding a workpiece in a known, repeatable position and orientation wherein the plate has a workpiece receiving face, a first plurality of threaded holes in the face in a workpiece specific pattern for defining the location and orientation of the workpiece on the plate and adapted to locate and hold workpiece clamping devices on the plate and a second plurality of bolt clearance holes in the face of the plate for attaching the plate to the carrier.

Advantageously the fixturing apparatus in accordance with this invention achieves the reproducible, accurate location and holding of the workpiece thereon for machining through the reproducible accurate location and holding of the workpiece on the mounting plate and in turn the accurate positioning and attachment of the mounting plate on the carrier apparatus. Further, the apparatus of this invention advantageously reduces or eliminates the probability of incorrect and inaccurate location of the workpiece on a fixture or workpiece holding apparatus for machining, especially in automatic and flexible machining systems.

The mounting plate in the fixturing apparatus in accordance with this invention has, on the surface to which the workpiece is attached, a pattern of threaded holes that is specific to the workpiece and that defines a reproducible accurate single specific location and single specific orientation of the workpiece on the plate. In addition to such reproducible accurate location of the workpiece, the pattern of threaded holes on the plate provide for the effective efficient attachment of devices for clamping the workpiece to the plate. Further, the workpiece specific threaded hole pattern reduces the probability of the incorrect and inaccurate positioning and clamping of the workpiece. When a given workpiece, clamped to the mounting plate in the apparatus of this invention, has been machined and removed from the mounting plate the clamping and support devices, attached to the mounting plate at the threaded hole pattern for holding the workpiece on the plate, may be removed. At some later time, however, the clamping and support devices may be reinstalled on the mounting plate at the threaded hole pattern to locate and hold a workpiece of the same geometry on the mounting plate at the same accurate position as the previous workpiece. With the appropriate referencing of the threaded hole pattern from the perimeter of the mounting plate there may be produced a series of mounting plates that will result in the reproducible accurate location of a number of individual workpieces of the same size and shape on the individual mounting plates for attachment to the carriers in the apparatus of this invention.

In accordance with this invention the carrier apparatus according to one aspect of this invention has a support having a planar surface for receiving and releasably holding the mounting plate and a base. That planar surface has therein a plurality of threaded holes that mate with the bolt clearance holes in the mounting plate to receive bolts passing through the clearance holes for releasably attaching the mounting plate to the support. On two adjacent sides of the perimeter of the planar surface of the support there are located a plurality of (i.e. rigid) locating stop means. When attaching the mounting plate to the carrier apparatus the plate is urged against these stops to positively and accurately locate the plate on the planar surface of the support. On the opposing sides of the perimeter of the planar surface (i.e. sides opposite to the sides having the stops) are attached means for urging the plate against the locating stops. The means for urging may be a bolt threaded through a bar, attached to the perimeter of the surface on the side opposite to the locating stop, and engaging the perimeter of the mounting plate to urge it against the locating stops. Thus, the mounting plate is reproducibly and accurately positioned on the planar surface of the support.

The cooperation between the accurate workpiece specific threaded hole pattern in the workpiece mounting plate and the locating stops on the perimeter of the planar surface of the support produces to be reproducibly accurate positioning or location of the workpiece on the fixturing apparatus. Having attained the accurate positioning of the workpiece on the fixturing apparatus it is next a matter of locating the apparatus, more particularly the carrier apparatus of this invention on and attaching it to the table of a machine tool or the pallet of an automated machining system. Usually the table of the machine tool and the pallet of an automatic machining system have accurately machined grooves or slots for the location and attachment thereto of the carrier apparatus of this invention. The base of carrier apparatus of this invention may, for example, have slots through which bolts may be passed for the attachment of the carrier apparatus to the table of a machine tool or pallet of an automated machining system. Attachment or clamping of the workpiece to the workpiece mounting plate of the fixturing apparatus of this invention may be accomplished by hand operated mechanical clamping and support devices or by hydraulically operated clamping and support devices as are well known in the art. Other clamping and support devices as are known in the art may also be used in clamping the workpiece to the mounting plate of the apparatus of this invention.

Figure 1:
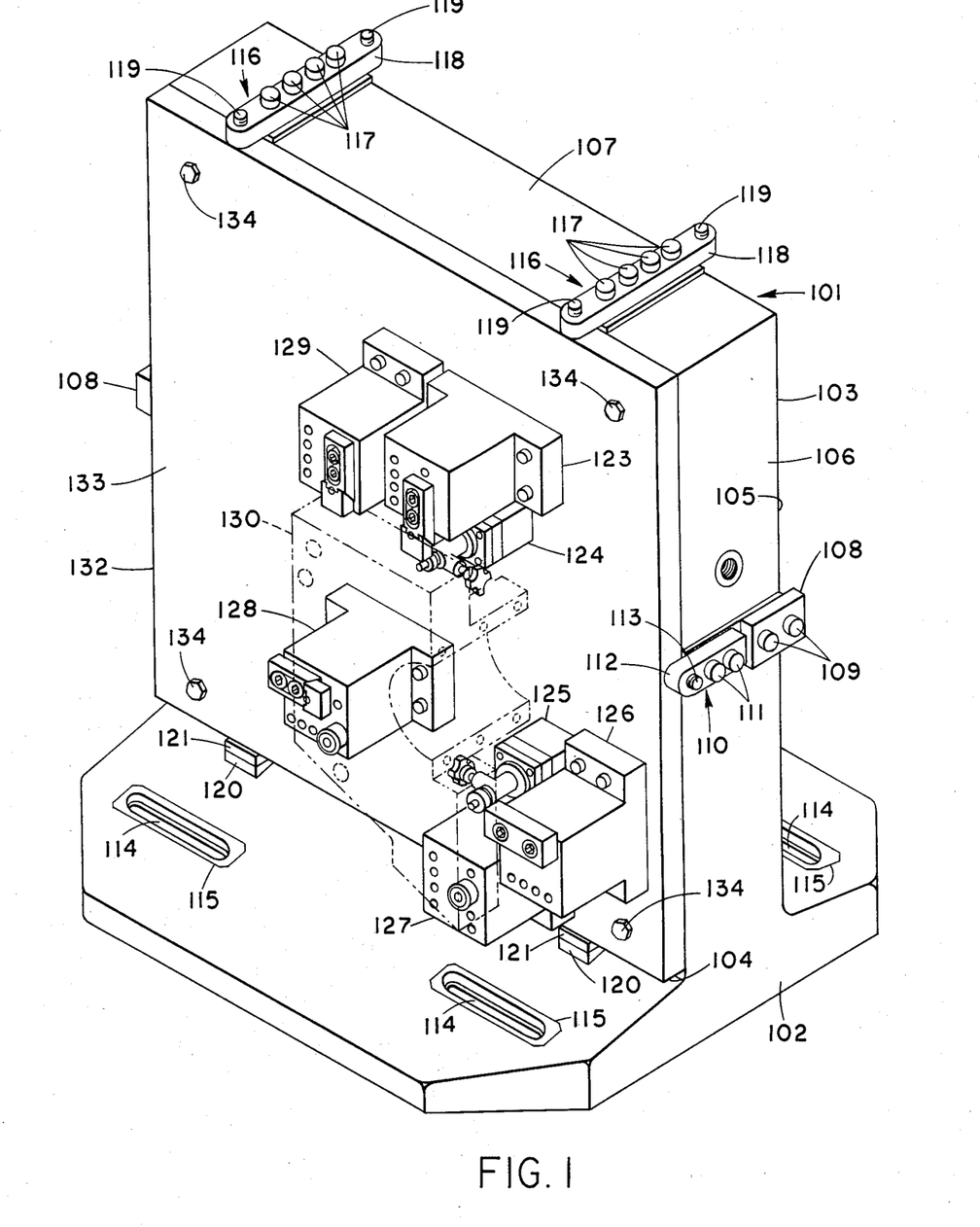
FIG. 1 shows in an isometric view a fixturing apparatus according to this invention with a workpiece, shown in phantom, located and clamped thereon.

An isometric view of a preferred embodiment of the fixturing apparatus according to this invention is shown in FIG. 1 including, for purposes of illustration, a workpiece, in phantom, and the clamping and supporting devices for holding the workpiece. Carrier apparatus 101 is of a geometry commonly referred to as a T post and has a base 102 from which rises a vertical section support 103 having two planar surfaces 104 and 105 for attaching a workpiece mounting plate. Two vertical faces 106 at opposite ends of vertical section support 103, a top horizontal face 107 of vertical section support 103 and base 102 form a perimeter for surfaces 104 and 105. Attached to each of vertical faces 106 are a rigid rectangular metal locating stop 108 by bolts 109 and colinear with each stop 108 a pusher 110 by bolts 111. The pusher 110 has a metal bar 112 through which a bolt 113 is threaded at the free end of the bar. Each stop 108 and pusher 110 extend horizontally for a short distance beyond the intersection of surface 104 and face 106 and surface 105 and face 106. One stop 108 and one pusher 110 are located on each face 106 such that a pusher 110 is opposite to and facing a stop with the bolt 113 of pusher 110 threadable toward a stop 108. In base 102 are located four elongated openings 114 having a stepped metal frame 115 through which bolts (not shown) pass for the attachment of carrier 101 to a fixture receiving surface (e.g. machine tool table, pallet or automatic guided vehicle) when machining or transporting the workpiece.

On the top horizontal face 107 of vertical section support 103 are mounted two spaced apart pushers 116 by bolts 117, each pusher having a rectangular metal bar 118 with curved ends extending a short distance beyond the intersections of surface 104 with face 107 and surface 105 with face 107 to form free ends. Threaded through each free end is bolt 119. In line with each of the bolts 119 and located in base 102 at the junction of base 102 with vertical section support 103 are metal blocks 120. Two of the blocks 120 are located in base 102 at the intersection of surface 104 and base 102 and two of the blocks 120 are located in base 102 at the intersection of surface 105 and base 102. Attached to each of blocks 120, by bolts not shown, are right angle metal pads 121 (see FIG. 2).

A metal workpiece mounting plate 132 having a workpiece specific pattern of threaded holes in a mounting surface 133 (see FIG. 2) for attaching workpiece clamping and supporting devices 123 to 129, not forming a part of this invention, for holding workpiece 130, shown in phantom, on plate 132, is placed against surface 104 with one edge (i.e. left edge) of plate 132 against stop 108 and the adjacent bottom edge of plate 132 against right angle pads 121. Screw 113 of pusher 110 is then threaded against the right edge of plate 132 (i.e. the edge opposite to the edge contacting stop 108) to force plate 132 against stop 108 and two bolts 119 of top pushers 116 are threaded against the top edge of plate 132 to force plate 132 against pads 121 to accurately and positively position plate 132 on carrier apparatus 101. The plate 132 is then attached to surface 104 of carrier apparatus 101 by bolts 134 passing through clearance holes in plate 132 and threading into mating threaded holes in surface 104. Workpiece 130 is now reproducibly, accurately positioned on the fixturing apparatus for location at a machine tool for machining.

Figure 2:
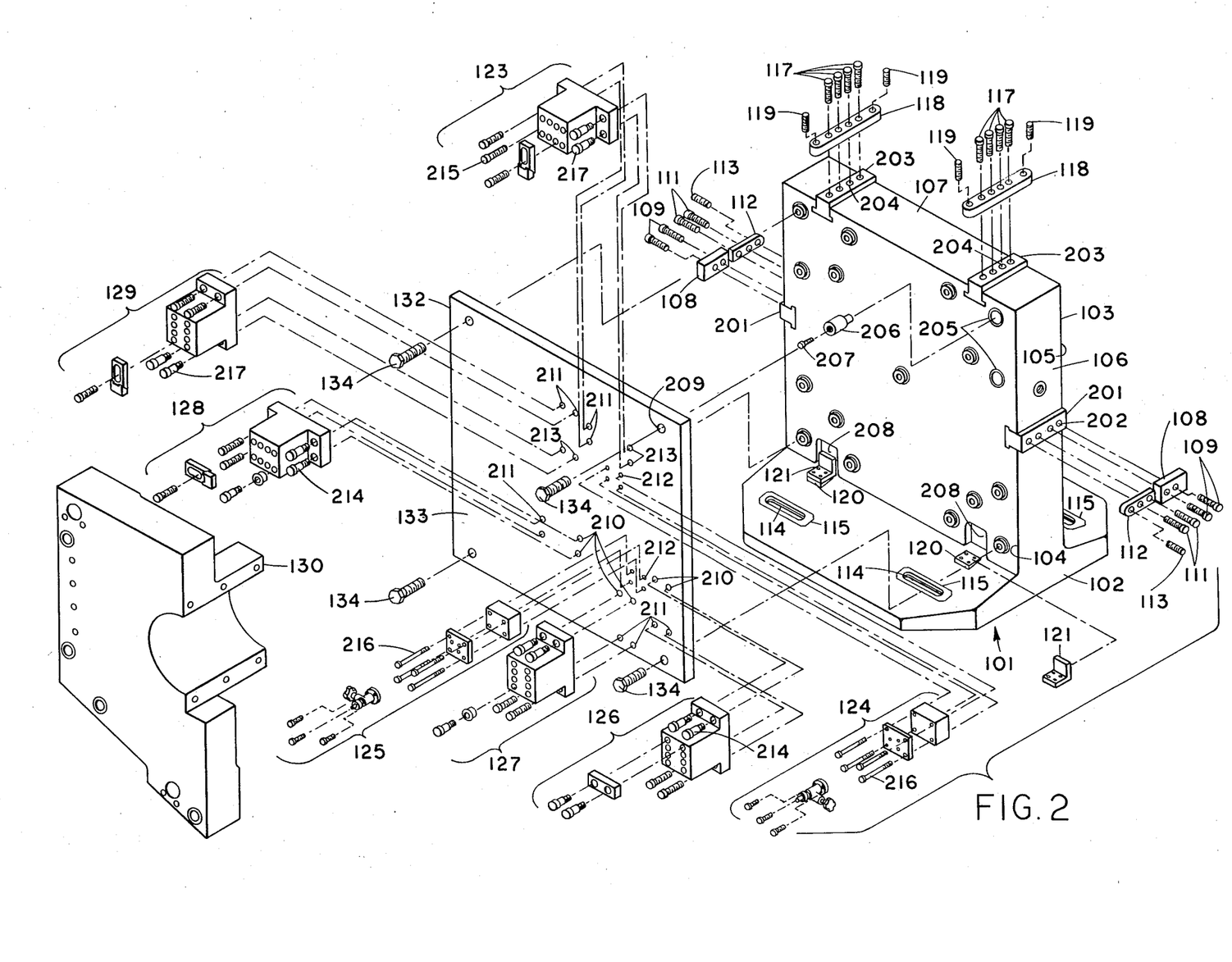
FIG. 2 is an exploded view showing the elements of the fixturing apparatus of this invention shown in FIG. 1 and the workpiece which attaches to the apparatus.

The preferred fixturing apparatus and carrier apparatus according to this invention as shown in FIG. 1 is described in greater detail in the exploded isometric view in FIG. 2. It is further preferred in the practice of this invention that the base 102 and vertical section support 103 of the carrier apparatus 101 be a unitary molded structure of a highly filled epoxy resin in which the filler is a particulate mineral material of varying particle size. The filled epoxy resin and the method of molding the unitary structure will be described in greater detail in a subsequent part of this disclosure.

Since the base 102 and vertical section support 103 are a molded, unitary, non-metallic structure certain elements (i.e. metal inserts) have to be molded into base 102 and vertical section support 103 for the completion of the assembly of carrier apparatus 101. Thus, in the vertical section support 103 metal inserts 201 having tapped holes 202, for receiving bolts 109 and 111, are molded into side faces 106 for the attachment of stop bars 108 and pusher bars 112 via bolts 109 and 111 respectively. Metal inserts 203 having tapped holes 204, for receiving bolts 117 are molded into top face 107 of vertical section support 103 to which are attached pusher bars 118 by bolts 117. The threading of bolts 113 and 119 into pusher bars 112 and 118 respectively completes the pushers 110 and 116 of FIG. 1. Knurled tubular inserts 205 are molded horizontally into vertical section support 103 with their open ends flush with surfaces 104 and 105 and having a short internally threaded section midway along the longitudinal axis of the insert, see FIG. 7. Into the smooth hole of insert 205 is placed a cylindrical plug 206 with a sliding, low clearance (e.g. 0.0002 inch) fit against insert 205. Plug 206 has a through concentric stepped double hole along its longitudinal axis wherein the larger hole is threaded and of a diameter larger than the head of cap screw 207 and the smaller hole is smooth and of a diameter for the clearance fit of the body of cap screw 207. The larger diameter hole of the plug 206 faces outward from the insert and the end of plug 206 extends a short distance (e.g. ¼ inch) beyond insert 205 and therefore a short distance (e.g. ¼ inch) out from surfaces 104 and 105. Cap screw 207 is inserted into plug 206 and threaded into the tapped central portion of insert 205 to hold plug 206 in place. In carrier 101 each insert 205 may have two plugs 206, one plug 206 extending from surface 104 and the other plug 206 extending from surface 105. In each of surfaces 104 and 105 the outer faces of plugs 206 extending from the surface are made to be in a common vertical plane. This is achieved by machining the outer faces of the plugs 206 after the plugs 206 have been installed in inserts 205. Plug 206 may be advantageously replaced if damaged during machining or use by unbolting the plug from insert 205 and pulling the plug 206 from insert 205 and installing a new plug 206. Two spaced apart recesses 208 are molded into each of surfaces 104 and 105 at the intersection of these surfaces with base 102. At each recess 204 there is molded into base 102 a metal block 120 having threaded holes in its top surface. Block 120 terminates at the opening of recess 208 and extends outward from recess 208. A hardened metal right angle pad 121 having bolt holes in its horizontal portion is bolted onto each block 120 with the solid vertical portion of the pad in recess 208. The solid vertical portion of the pad extends outward from recess 208 a short distance beyond surface 104 or 105. At the time the outer faces of plugs 206 are machined to a common vertical plane, the vertical portion of pad 121, extending from recess 206, serves as a reference surface for machining plug 206 so that the outer face of plugs 206 and the outer face of vertical portion of pad 121 are in the same plate. Pad 121 has a dual function. It is a positive bottom rest or stop for plate 132 and the vertical portion of the pad is a striker plate protecting surfaces 104 and 105 against damage while plate 132 is being attached to surface 104 or 105. Plugs 206 are used to bolt plate 132 to surface 104 or 105 of carrier apparatus 101. Two spaced apart essentially rectangular frames 115 having a steCpped opening 114 along the longitudinal axis and a groove on the exterior perimeter are molded into base 102 adjacent to each of surfaces 104 and 105. Bolts, not shown, passing through the frames attach carrier apparatus 101 to a pallet, machine table or other surface for machining workpieces.

The rectangular, metal, workpiece mounting plate 132 of FIGS. 1 and 2, attachable to surface 104 or 105 of carrier apparatus 101 by bolts 134 passing through clearance holes 209 in plate 132 and threading into plugs 206 in surface 104 or 105, has a workpiece specific pattern of tapped holes 210, 211, 212 and 213 for attaching fixturing devices 123 to 129, e.g. clamps, jacks and stops, to plate 132 for positioning, supporting and clamping workpiece 130 to surface 133 of the plate. Surface 133 is provided with a series of very accurately positioned counterbored tapped holes 210, in a workpiece 130 specific pattern, which have a precision bored unthreaded upper section and a tapped lower section for receiving the precision ground shoulder bolt 214 to accurately position and hold the fixturing devices 126 to 128 on plate 132. A second series of straight completely tapped holes 211 and 212, also in a workpiece 130 specific pattern on surface 133, provide for the completion of the attachment of fixturing devices 123 and 126 to 129 to plate 132 and for the attachment of support fixturing devices 124 and 125 to plate 132. The very accurate positioning of tapped holes 111 and 212 is not as essential as in the case of holes 210 because holes 210 accurately locate the fixturing devices 126 to 128 on surface 133 and tapped holes 211 receive bolts 215 to provide for the completion of the attachment of devices 123 and 126 to 129 to plate 132. The accurate location of support fixturing devices 124 and 125 on surface 133 is important, however, the very accurate location of fixturing devices 124 and 125 is not required and therefore the very accurate location of tapped holes 212 in surface 133 for the attachment of devices 124 and 125 by bolts 216 is not required. This does not mean that the accuracy of the location of tapped holes 211 and 212 can be totally disregarded. What it means is that the accuracy of the location of tapped holes 211 and 212 need not be as great as the accuracy of the location of holes 210. Counterbored threaded holes 213 for receiving shoulder bolts 217 to position and hold fixturing devices 123 and 124 are located on surface 133 with the same accuracy as the location of threaded holes 211 and 212.

Figure 3:
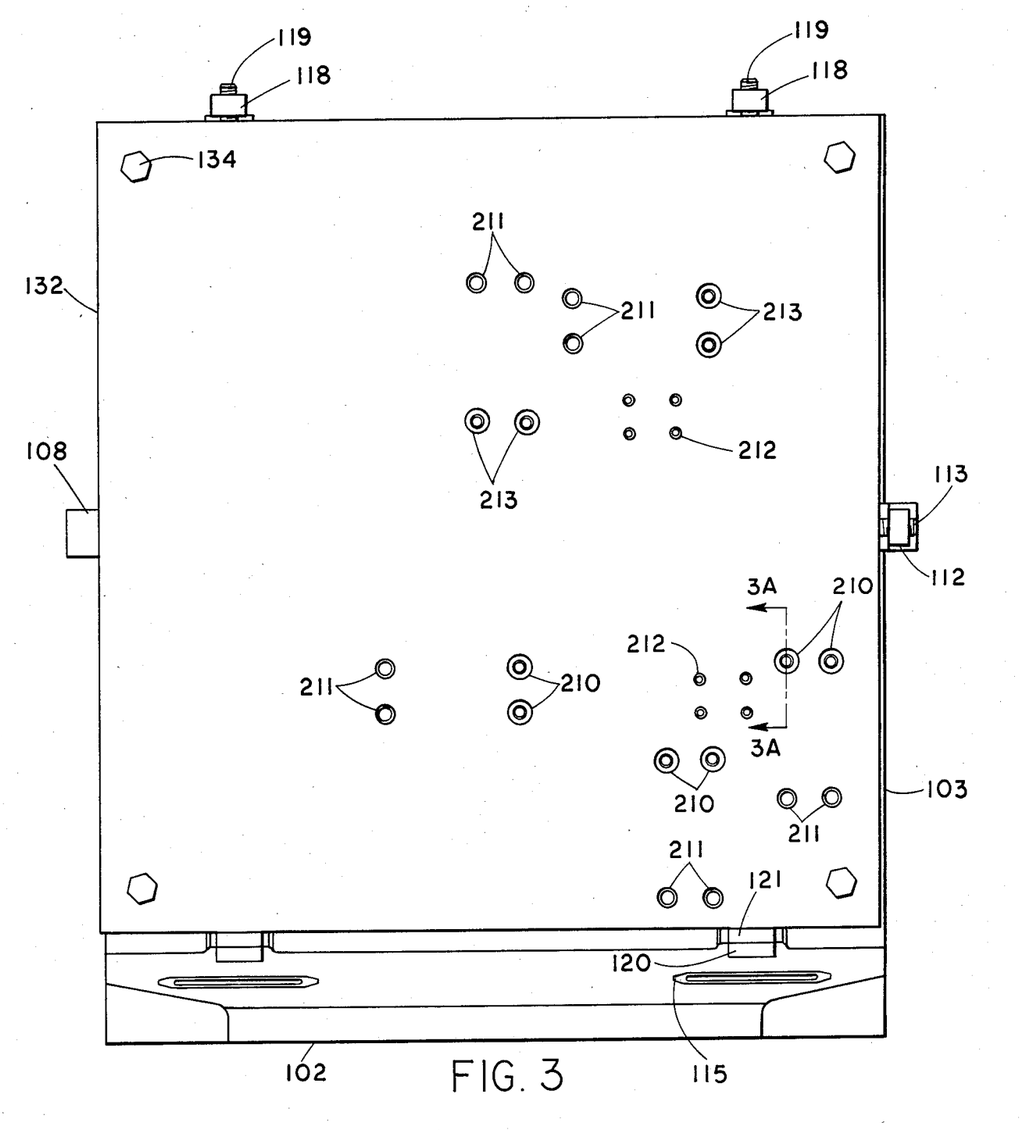
FIG. 3 is a front elevation view of a fixturing apparatus in accordance with this invention with a workpiece mounting plate in place on the carrier.
Figure 3A:
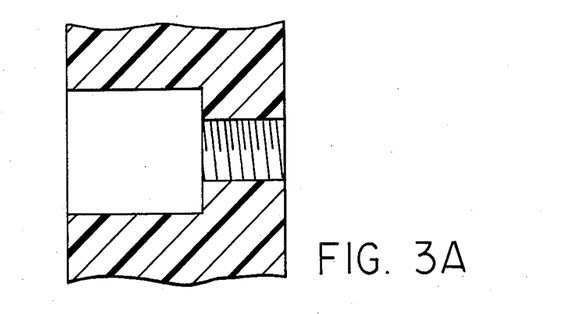
FIG. 3A shows a cross-section of a counterbored and threaded hole in the workpiece mounting plate.

Turning now to FIG. 3 there is shown a front elevation view of a fixturing apparatus in accordance with this invention which is a front view of the fixturing apparatus shown in FIG. 1 minus the workpiece 130 and the fixturing devices 123 to 129. The plate 132 is positively positioned against stop 108 and pads 121 respectively by bolt 113 threading through bar 112 of side pusher 110 and pressing against plate 132 and by bolts 119 threading through bars 118 of top pushers 116 to press against plate 132. Thus plate 132 is accurately and reproducibly positioned on the vertical section support 103 of the carrier apparatus 101. Bolts 134 passing through clearance holes in plate 132 and threading into plugs 206 bring plate 132 uniformly against vertical section support 103 and hold the plate in position. The workpiece specific pattern of threaded holes 210,211,212 and 213 in plate 132 for attaching fixturing devices to position, support and clamp workpiece 130 on the fixturing apparatus of this invention is shown in FIG. 3. The size of the holes and the pattern of the holes in plate 132 will depend on the geometry of the workpiece, the fixturing devices used and the machining to be performed. In the hole pattern shown in FIG. 3 the holes 210 are very accurately located on surface 133 of plate 132 and have a precision bored unthreaded upper section and a lower threaded section, see FIG. 3A. Thus holes 210 accurately locate the positioning fixturing devices 126 to 128 on plate 132 and hence accurately locate the workpiece on plate 132. The workpiece specific pattern of holes on plate 132 permits subsequently installed workpieces of the same geometry to be positioned and clamped on plate 132 in the same location each time, as the first workpiece, easily and with the same accuracy as the first workpiece. Therefore, the workpiece specific hole pattern in plate 132 cooperatively in combination with the stops and pushers on the carrier apparatus of this invention permits the subsequent workpieces of the same geometry to be positioned and held in the fixturing apparatus of this invention the same each time with a high degree of accuracy.

Figure 4:
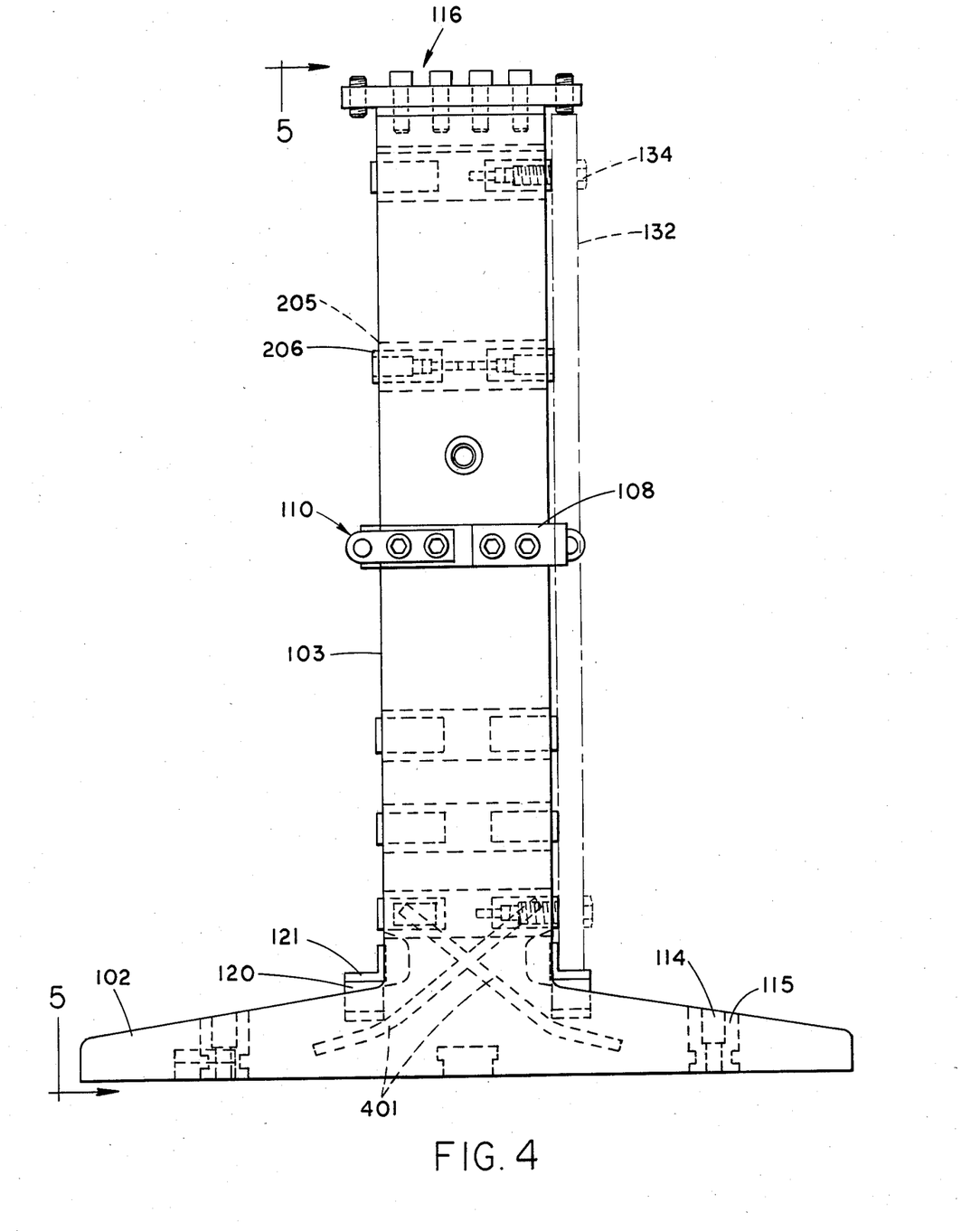
FIG. 4 shows a side elevation view of a carrier apparatus according to this invention with a mounting plate shown in phantom thereon.

Referring now to FIG. 4 there is shown a side view of the carrier apparatus according to this invention as shown in FIGS. 1 and 2. A workpiece mounting plate is shown in phantom on one side of the carrier. In this view are shown preferred molded in curved reinforcing rods 401 at the junction of the molded highly filled epoxy resin base 102 and vertical section support 103 of the carrier apparatus. The carrier apparatus 101 shown in FIG. 4 has four pairs of crossed reinforcing rods 401, one pair at each of the four inserts 205 located across the bottom of vertical section support 103, see FIG. 2. Each rod 401 of the pair of crossed rods is attached (i.e. welded) at one end to a flat surface on the opposite exterior sides of the insert 205 at the bottom of vertical section support 103, as more fully shown in FIG. 7, and the free end of rod 401 extends down into base 102. The rods 401, whose diameter may vary with the size of the carrier apparatus, reinforces the junction between base 102 and vertical section support 103 of the molded particulate mineral filled epoxy resin structure of which base 102 and vertical section support 103 are made.

Figure 5:
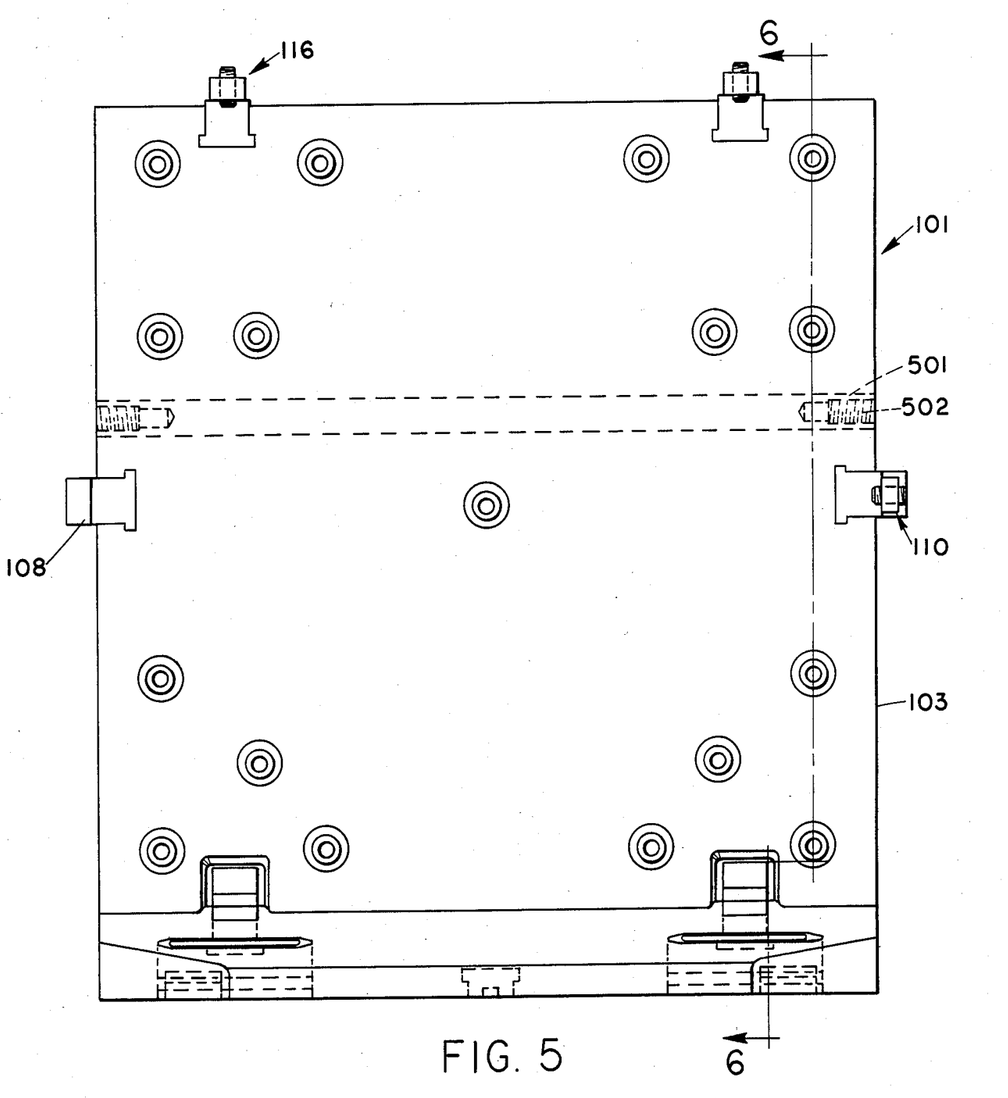
FIG. 5 shows a front elevation view along line 5—5 of FIG. 4 of a carrier apparatus according to this invention.

A front view of carrier apparatus 101 of FIGS. 1 and 2 is shown in FIG. 5. The vertical section support 103 of carrier apparatus 101 has molded horizontally therein a knurled cylindrical rod 501 extending from one side 106 to the opposite side 106 of the vertical section 103 and ending flush with each of sides 106. At each end of the rod 501 is a tapped hole 502 which receives a bolt for attaching a lifting device, not shown, for picking up and transporting the carrier apparatus 101.

Figures 6, 8, 9:
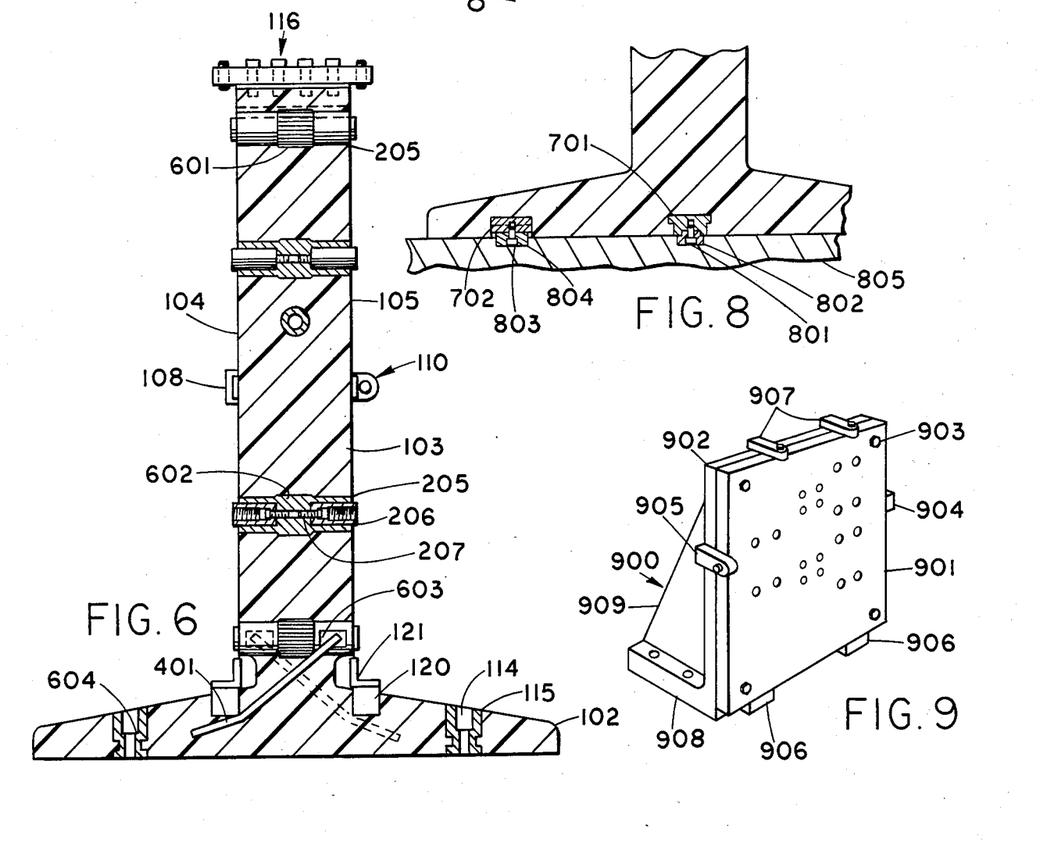
FIG. 6 is a sectional view taken along line 6—6 of FIG. 5.
FIG. 8 is a partial sectional view taken along line 8—8 of FIG. 6.
FIG. 9 shows an isometric view of an alternate embodiment of the fixturing apparatus according to this invention.

FIG. 6 shows a section of carrier apparatus 101 taken along line 6—6 of FIG. 5 and provides further details as to metal frame 115 in base 102, metal inserts 205 in vertical section support 103 and reinforcing rods 401. Insert 205 molded into vertical section support 103 has a knurled portion 601 on the outside surface of a longitudinal solid central region 602 of insert for improving the retention of the insert in the vertical section support. Cylindrical metal plug 206 has a low clearance (e.g. 0.0002 inches) sliding fit in the unthreaded bore of insert 205 and is held in place by placing bolt 207 through the clearance hole in the bottom of plug 206 and threading the bolt into a tapped hole in the solid central region 602 of insert 205. Plug 206 extends out from insert 205 a short distance (e.g. ¼ inch) and is machined or ground so that all of the outside faces of plugs 206 in each of surfaces 104 and 105 lie in a common vertical plane. Should a plug 206 become damaged during machining or grinding or during use of the carrier apparatus 101 it advantageously can be easily removed and replaced with a new plug 206 which is then machined or ground to have its outer face lie in a vertical plane common to the outer faces of the other plugs 206. Reinforcing rod 401 is attached to a flat 603 on the exterior of insert 205 and extends into base 102 to reinforce the junction between base 102 and vertical section support 103. A pair of rods 402 is attached to each of inserts 205, one rod on each side of the insert in a crossing pattern, along the bottom of vertical section support 103. Bolts, not shown, passing through opening 114 in metal frame 115 and having their heads engaging shoulder 604 of frame 115 are used to attach the carrier apparatus to a pallet or other surface for supporting the fixturing apparatus according to this invention during the machining of the workpiece.

Figure 7:
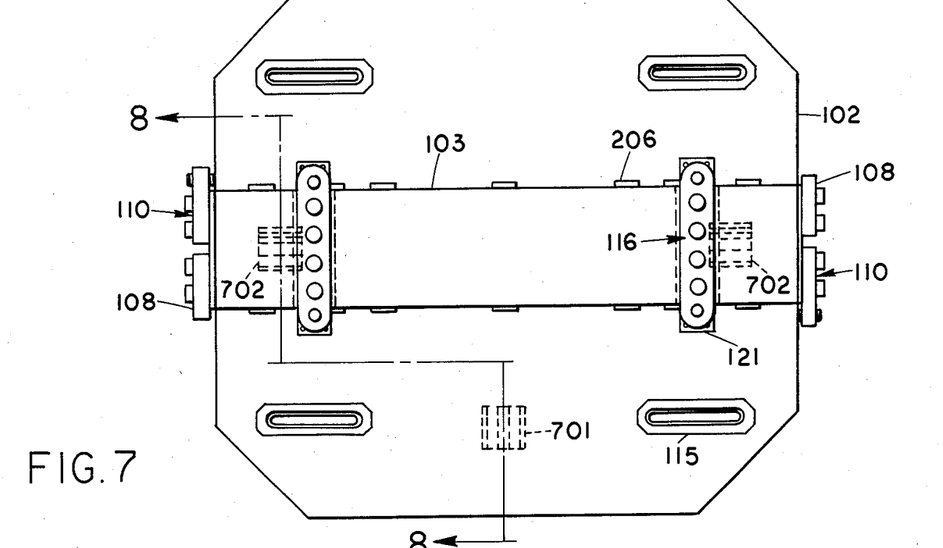
FIG. 7 is a top plan view of a carrier apparatus according to this invention.

A top plan view of the carrier apparatus in accordance with this invention, as shown in FIGS. 1 and 2, is given in FIG. 7. There are molded into base 102 metal blocks 701 and 702 having a tapped hole for the attachment of key, more fully shown in FIG. 8, to position the carrier apparatus on a pallet or other surface. The blocks 701 and 702 are flush with the bottom surface of the base 102. FIG. 8 is a partial section taken along line 8—8 of FIG. 7 and gives further detail as to blocks 701 and 702 and the keys for positioning the carrier apparatus on a pallet or other surface. Each of blocks 701 and 702 has a vertical tapped hole for threadably receiving bolts 801 and 803 to attach keys 802 and 804 respectively to blocks 701 and 702 respectively. The keys 802 and 804 mate with and ride in grooves in a pallet or other surface 805 to position the carrier apparatus on the pallet or other surface 805 prior to the bolting down of the carrier apparatus to that pallet or other surface. Often a pallet or other surface (e.g. machine tool table) will have a central groove accurately machined therein for locating purposes. The key 802 would mate with and ride in that central groove. The keys 804 then mate with and ride in secondary grooves in the pallet or other surface to prevent the rotation of the carrier apparatus and to establish the proper orientation of surfaces 104 and 105 on the pallet or other surface.

Although the carrier apparatus and fixturing apparatus of this invention has been shown with respect to a geometry having a vertical section of a carrier centrally positioned on and normal to a base in what is commonly known or referred to as a T (tee) post geometry there may be used in the practice of this invention other configurations of the carrier apparatus to which the workpiece mounting plate having the workpiece specific hole pattern for mounting the workpiece, is attached. Such other configurations include for example a square column geometry and L bracket configuration, see FIG. 9. In the L-bracket carrier apparatus configuration 900 as shown FIG. 9 the workpiece mounting plate 901 is attached to the outer surface of the vertical leg 902 of the carrier 900 by bolts 903 and is positioned against stop 904 by pusher 905 and against pads 906 by pushers 907. The horizontal base 908 of carrier apparatus 900 is then attached to a pallet or other surface. Rib 909 reinforces vertical leg 902. It is also contemplated in the practice of this invention that there may be employed mechanical, pneumatic or hydraulic clamping devices, known in the art, attached to the workpiece mounting plate for clamping the workpiece thereto. Further, there is contemplated in the practice of this invention the attachment of locators, jacks, support blocks or spacers known in the art to the workpiece mounting plate for the mounting of the workpiece thereto.

In FIG. 2 is shown mounting plate 132 of FIG. 1 in accordance with this invention having a workpiece specific pattern of threaded holes for the location and holding of workpiece 130 (FIG. 1) on the plate. The pattern of threaded holes in surface 133 of plate 132 provides for the mounting of locating, supporting and clamping devices, 123 to 129 of FIG. 1, for the mounting of workpiece 130 on plate 132. This pattern is based upon the configuration of the workpiece and the machining operation or operations to be performed. In the workpiece 130 specific pattern of holes in the surface 133 of mounting plate 132 threaded attaching holes 211 are used in conjunction with positioning holes 210 and locating holes 213 for the bolting of locating stop carrying blocks and clamp carrying blocks to surface 133 for locating and holding workpiece 130 on plate 132. Attaching holes 211 are threaded through holes of uniform diameter which receive bolts 215 (FIG. 2) for bolting the blocks to surface 133. Positioning holes 213, located on surface 133 within normal (i.e. standard) tolerances are counterbored holes having an unthreaded upper portion and a threaded lower portion of smaller diameter than the upper portion. Holes 213 receive a shoulder bolt 217 (FIG. 2) passing through a flange of a block, with the shoulder fitting into the unthreaded portion of the hole and threading into the lower portion of the hole to position and hold a clamp carrying block on surface 133. Locating holes 210 are accurately placed on surface 133 with respect to two precisely ground mutually perpendicular adjacent sides of plate 132 and have a precision reamed unthreaded upper section of larger diameter than a lower threaded section of the hole (see FIG. 3A). Precision ground shoulder bolts 214 (FIG. 2) passing through a flange on the locating stop carrying block fit into the unthreaded section of hole 210 and thread into the lower section of hole 210 to accurately locate the locating stop carrying block on surface 133. To attach workpiece 130 supports (e.g. jacks) on plate 132 there are provided threaded holes 212 at appropriate positions on surface 133. Holes 212 do not pass completely through plate 132. Mounting holes 209 are through holes for receiving bolts 134 (FIG. 2) to attach plate 132 to the carrier apparatus according to this invention.

Prior to the placement of the workpiece 130 specific pattern of holes in surface 133 of plate 132 the plate 132 is prepared by grinding surface 133 parallel to the back surface of the plate and precision grinding two adjacent sides of plate 132 perpendicular to each other. These ground mutually perpendicular sides of plate 132 serve as references from which to locate and place the holes in surface 133. In the case of the accurately located holes 210 there may be used a precision jib bore to produce the holes or as has been done by the applicant threaded holes 18 may be placed in the precision ground mutually perpendicular adjacent sides of plate 132 for attaching precision ground bars. Precision drill jigs are then located on surface 133 from the attached precision bars and bolted to surface 133 at holes not shown. The holes 210 are then drilled using the drill jig to guide and position the drill bit. Upon removing the drill jigs and precision bars from plate 132, the remaining operations for completing the holes are performed.

In the preferred practice of this invention the workpiece mounting plate is a metal plate more preferably a steel plate and the base and support are a unitary molded highly filled epoxy resin structure wherein the filler is a particulate mineral, more especially a particulate rock of a mixture of particle sizes and even more especially a particulate granite of a mixture of particle sizes. Preferably the filler constitutes 90 to 97% by weight of the highly filled epoxy resin molding composition, the remaining weight percent being essentially epoxy resin, hardeners catalysts or accelerators and optionally reactive dilutents.

A T-post geometry unitary molded vertical section support and base, as shown in FIGS. 1 and 2 was made of a highly filled epoxy resin system in the following manner. The various parts of a mold having the required T geometry cavity, when assembled, had their cavity forming surfaces coated with a wax which was then overcoated with a water and alcohol solution of a polyamide release agent. Upon evaporating the water and alcohol there resulted release agent coated surfaces. To the release agent coated cavity surfaces were attached the various metal inserts, including bars 201 and 203 for attachment of pusher bars 112 and 118 and stops 108, frames 115, blocks 120 for attachment of pads 121, inserts 205, reinforcing rods 401 and 501 and blocks 701 and 702 (see FIGS. 1, 2, 4, 5 and 8), and the mold assembled. The assembled mold was then bolted to the platform of a vibration table. Batches of a highly filled epoxy resin system were prepared by incrementally adding, with agitation, crushed granite rock, having a particle size range of from less than 0.08 mm to about 16 mm in diameter, to any epoxy resin mixture having a low viscosity (i.e. 250 to 400 cps) bis-phenol A type epoxy resin and 23% by weight, based on the total weight of the mixture, of trimethyl-1,6-hexamethylene diamine. Agitation was continued until complete wet out of the rock was achieved. The batches of filled epoxy resin system contained 93.7% by weight of the crushed granite rock. Vibration of the mold by the vibrating table was initiated and then individual batches of the filled epoxy resin system added to the cavity of the vibrating mold until the cavity was filled. Vibration of the mold was continued for several minutes after the cavity had been completely filled and then the vibration ceased. The mold with its contents were than allowed to stand at room temperature for 18 hours, whereupon the mold was disassembled to remove the molded T post. Assembly of the carrier apparatus was completed by the appropriate attachment of pusher 110 and 116, stops 108, pads 121 and keys 802 and 804 (see FIGS. 1, 2 and 8), the installation of plugs 206 in inserts 205, and the machining of the outer faces of plugs 206 to lie in a common vertical plane along with the vertical outer faces of pads 121.

Although the carrier apparatus of this invention has been described with respect to a unitary molded filled epoxy resin system structure and the method of making that structure it is contemplated in the practice of this invention that other materials (e.g. iron and steel) and other methods (e.g. casting and welded plate fabrication) may be employed to make the carrier apparatus. Such other materials and methods may not require the use of inserts as taught in this disclosure but may have the required tapped holes included directly in the material of construction for mounting the stops, pusher and pads.

A workpiece mounting plate 132 (FIG. 2) for workpiece 130 (FIG. 2) was prepared from a square steel plate having both major surfaces ground parallel to each other and adjacent sides made normal to each other. A series of accurately located tapped holes in a pattern specific to workpiece 130 made in one of the two major surfaces of the plate. In this series of holes some were entirely threaded while others had a counter bored, reamed unthreaded upper portion and a regular threaded lower portion. Four through bolt clearance holes, one in each corner of the major surfaces of the plate, were made to receive bolts for attaching the plate to the carrier apparatus.

In the practice of this invention a number of assembly modes may be used. Workpiece 130 support and clamping devices may be bolted to plate 132 and then workpiece 130 located and clamped onto the plate 132. The plate 132 with workpiece 130 clamped thereto may then be located on and attached to carrier apparatus 101. Alternatively mounting plate 132 may be located on and attached to carrier apparatus 101, the workpiece 130 support and clamping devices bolted to plate 132 and then workpiece 130 located and clamped to plate 132.

What is claimed is:

1. A fixturing apparatus for positioning and holding a workpiece during a metal working operation comprising:
   (a) a mounting plate for holding said workpiece in a known, repeatable position and orientation, said plate having a workpiece receiving face, a first plurality of threaded holes in said face in a pattern specific to said workpiece for defining the location and orientation of said workpiece on said plate and adapted to locate and hold workpiece support and clamp devices, wherein said first plurality of threaded holes includes holes having a counter-bored, reamed, unthreaded upper portion and a lower threaded portion adjacent thereto, and wherein said plate has a second plurality of clearance, plate mounting holes; and
   (b) a carrier apparatus for releasably and rigidly supporting said plate in an accurate, repeatable position thereon, said carrier apparatus comprising:
      (1) a unitary molded filled epoxy resin system structure wherein the filler comprises crushed granite rock having a mixture comprising particle sizes in the range of from 0.08 mm to 16 mm in the major diameter and constitutes from 50% to 99% by weight of said filled epoxy resin system;
      (2) at least one planar surface defined by adjacent perimeter faces substantially normal to each other end adapted to receive and hold said plate;
      (3) a base having a base surface substantially normal to said planar surface;
      (4) a plurality of non-movable plate locating stop means positioned at two adjacent perimeter faces of said planar surface and extending beyond said planar surface for engaging said plate;
      (5) pusher means positioned at perimeter faces of said planar surface opposing said stop means and extending beyond said planar surface for engaging and applying a force on said plate to urge said plate against said stop means; and
      (6) a plurality of threaded holes in said planar surface corresponding to said second plurality of clearance plate mounting holes.

2. A carrier apparatus comprising:
   a support element, having a structure of a unitary-molded highly-filled synthetic organic resin system, where the filler comprises
      crushed granite rock having a mixture comprising particle sizes in the range of from 0.08 mm to 16 mm in the major diameter and constitutes from 50% to 90% by weight of the filled synthetic organic resin system, said support element having
      a planar surface for supporting a workpiece mounting plate, and
      a base surface normal to said planar surface, said planar surface being defined by
      a plurality of support element bosses, each boss surrounding a threaded hole in said planar surface;
   a plurality of non-movable stops affixed to said support element at two adjacent perimeter faces of said planar surface, and extending beyond said planar surface for supporting said workpiece mounting plate; and
   a plurality of pushers affixed to said support element at adjacent perimeter faces of said planar surface opposing said stops, and extending beyond said planar surface for engaging and applying a force on said workpiece mounting plate to urge said plate against said stops.

3. A carrier apparatus according to claim 2, wherein the synthetic organic resin is an epoxy resin.

* * * * *